United States Patent

Reynolds

[11] Patent Number: 5,915,897
[45] Date of Patent: Jun. 29, 1999

[54] MACHINE TOOL WAY COVER AND METHOD OF MANUFACTURING SAME

[75] Inventor: Thomas C. Reynolds, Rockford, Ill.

[73] Assignee: Hennig, Inc., Machesney Park, Ill.

[21] Appl. No.: 08/932,213

[22] Filed: Sep. 16, 1997

[51] Int. Cl.⁶ ..................................................... B23C 9/00
[52] U.S. Cl. ........................... 409/134; 160/202; 160/223
[58] Field of Search ............................. 407/134; 160/202, 160/222, 223, 224; 82/152, 149

[56] References Cited

U.S. PATENT DOCUMENTS

| | | | |
|---|---|---|---|
| 3,578,061 | 5/1971 | Hascheck et al. | 160/202 |
| 3,603,373 | 9/1971 | Loos et al. | 160/223 X |
| 3,658,113 | 4/1972 | Loos | 160/222 X |
| 3,751,120 | 8/1973 | Kietz | 160/202 X |
| 3,785,418 | 1/1974 | Hennig et al. | 160/222 X |
| 3,964,801 | 6/1976 | Steinmetz | 160/202 X |
| 4,522,246 | 6/1985 | Bierbrauer et al. | 160/223 |
| 5,119,869 | 6/1992 | Hennig et al. | 409/134 X |
| 5,169,223 | 12/1992 | Suzuki et al. | 160/202 X |

*Primary Examiner*—William Briggs
*Attorney, Agent, or Firm*—Leydig, Voit & Mayer, Ltd.

[57] ABSTRACT

A machine tool way cover and method for manufacturing same with reduced material and labor cost. The present invention is machine tool way cover which is adapted to expand and contract over a transmission platform of the machine tool so as to protect the machinery contained therein from solid and liquid contaminants generated or expelled from the machine tool. A plurality of individual boxes are telescopingly connected to form the expandable way cover and each includes a back panel attached to an enclosure. The enclosure includes a plurality of tabs which are matingly received into apertures provided in the back panel and which are then bent perpendicular to the enclosure to hold the back panel firmly thereto. In order to prevent coolant and other liquid matter from passing between the back panel and the enclosure, an adhesive sealing strip is applied over the apertures of the back panel before the tabs of the enclosure are inserted therethrough.

6 Claims, 3 Drawing Sheets

MACHINE TOOL WAY COVER AND METHOD OF MANUFACTURING SAME

FIELD OF THE INVENTION

The present invention generally relates to mechanisms for protecting moveable machine tools from debris and contaminants, and more particularly relates to machine tool way covers.

BACKGROUND OF THE INVENTION

Modern machine tools are often adapted to move in various directions as they perform machining operations on a given work piece. The machines can be adapted to move via a variety of transmissions, including a wheeled platform which rides upon rails and which is powered by electrical or hydraulic primary movers, and screw conveyors which move the platform on which the machine tool is disposed back and forth as the threads of the screw are axially translated relative to a frame of the machine tool.

As the machine tool moves back and forth, side to side, or up and down, the machining operation of the machine tool will generate debris and contaminants, and coolant from the machine tool will often be expelled as well. Given the tight tolerances under which the machine tools are programmed to operate, the contaminants, debris, and coolant can often detrimentally disrupt these tolerances if they come into contact with the transmission means of the machine tool. In addition, electrical or hydraulic cables often extend from the machine tool to a power source and can also be detrimentally affected by such falling debris. It is therefore advantageous to provide some way of protecting the platform over which the machine tool moves to protect the transmission means from such debris, contaminants, and coolant.

Over the years, a variety of mechanisms have been employed for such protection. These mechanisms include way covers which are formed in the shape of telescoping sections which expand and contract with the machine tool as the machine tool moves over the transmission platform. The way covers can be shaped in a variety of configurations including, but not limited to, rectangular boxes, and cylindrical tubes. As the machine tool moves back and forth over the transmission platform, the individual boxes or tubes expand or contract to provide a covering for the transmission platform.

While such way covers have proven to be an effective means for protecting the transmission platform, they are fairly expensive to manufacture. This is due to two main reasons. One, the way covers often need to be manufactured from a substantially heavy gauge of steel to provide adequate protection given the industrial settings in which they operate, and two, the way covers are time consuming to manufacture in that each individual box or way cover must first be manufactured and then assembled together in telescoping fashion.

With prior art devices, the individual boxes of the way covers are often manufactured from a C-shaped enclosure and a C-shaped back panel disposed perpendicular to the enclosure. At the nexus between the back panel and the enclosure, spot welds are made to adhere the components together. Such a box will prevent solid debris and contaminants from reaching the transmission platform, but in order to prevent coolant and other fluid matter from passing therethrough, the joint between the back panel and the enclosure must be properly sealed. With prior art devices, silicone or an epoxy resin is sprayed or brushed over the joint between the back panel and the enclosure. The silicone or epoxy is expensive, and the spot welding and sealant application are time consuming. This results in a machine tool way cover which adds substantial cost to the overall expense of the machine tool.

SUMMARY OF THE INVENTION

It is therefore a primary aim of the present invention to provide a machine tool way cover which is inexpensive to manufacture.

It is an objective of the present invention to provide a machine tool way cover which is not only inexpensive to manufacture, but which also provides adequate protection from both solid and liquid matter.

It is yet another objective of the present invention to provide a method from manufacturing machine tool way covers which is streamlined, less labor intensive, and thus less costly to perform.

It is a feature of the present invention to accomplish these objectives by providing a machine tool way cover having a plurality of telescopingly connected enclosures wherein each enclosure includes a first member having an integral top, first side, and second side, wherein the top, first side, and second side have tabs extending therefrom in a parallel direction, a back panel having a top, first side, and second side which is connected perpendicularly to the first member, the back panel having a plurality of apertures adapted to matingly receive the first member tabs, and a sealing strip disposed between the first member and the back panel. The sealing strip provides the necessary sealant for preventing liquids from passing between the first member and the back panel while the tab and aperture connection system reduces the time and labor cost for producing the way covers.

It is another feature of the present invention to provide a method for manufacturing a machine tool way cover comprising the steps of applying a sealing strip to a back panel wherein the back panel includes a top, first side, and second side having a plurality of apertures therethrough, the sealing strip being applied so as to cover the plurality of apertures, inserting tabs of an enclosure through the apertures of the back panel, the enclosure having a top, first side and second side perpendicular to the back panel, the tabs penetrating the sealing strip during the inserting step, and bending the tabs against the back surface of the back panel so as to secure the back panel to the enclosure and compress the sealing strip therebetween. As opposed to prior art devices which require spot welding across the joint between the back panel and the enclosure and then application of a costly silicone or epoxy resin, the method of the present invention is far less costly and labor intensive.

These and other aims, objectives, and features of the present invention will become more apparent from the following detailed description when taken in conjunction with the accompanying drawings.

Figure 1:
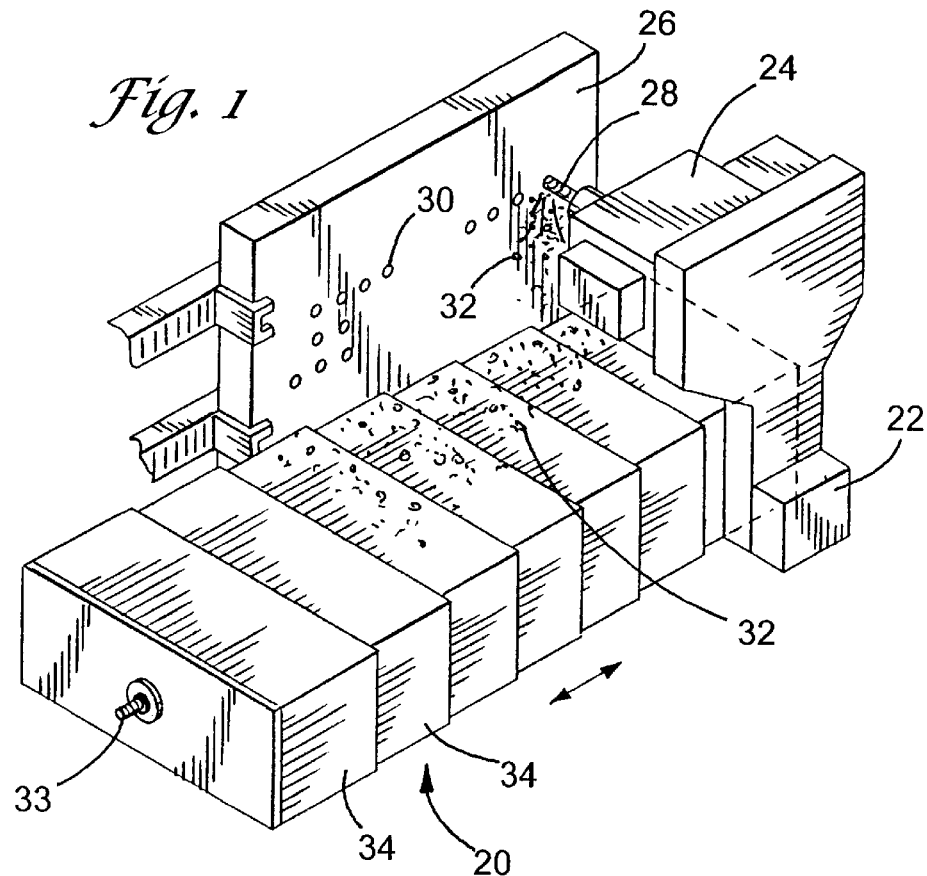
FIG. 1 is a perspective view of the preferred embodiment of the present invention shown extended and mounted to a machine tool.

While the present invention is susceptible of various modifications and alternative constructions, certain illustrative embodiments thereof have been shown in the drawings and will be described below in detail. It should be understood, however, that there is no intention to limit the present invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Referring now to FIG. 1, the present invention, as generally depicted by numeral 20, is a way cover for protecting the transmission platform 22 of machine tool 24. By the way of example only, a work piece 26 is shown adjacent machine tool 24. It can be seen that as machine tool 24 moves back and forth along transmission platform 22, drill 28 of machine tool 24 can machine holes 30 into work piece 26. As this machine operation is performed, debris 32 is generated which would tend to fall onto transmission platform 22 if not for way cover 20. In order to accommodate the moveable nature of machine tool 24, way cover 20 is configured in telescoping fashion to expand and contract as machine tool 24 moves. It is also to be understood that additional way covers 20 could be provided on additional sides of machine tool 24 to protect in additional directions as well.

The debris which could potentially interfere with the proper operation of machine tool 24 is not only generated by the drill 28 causing fragments 32 to be exhausted from work piece 26, but coolant from machine tool 24 could also drip into transmission platform 22. One example of the transmission means is shown in FIG. 1 as a conventional screw conveyor 33 which rotates to allow the machine tool 24 to move back and forth. Therefore, in order to provide adequate protection to transmission platform 22, way cover 20 must not only prevent solid matter from passing therethrough but liquid matter as well.

As stated above, machine tool way covers have proven to be successful in preventing such contamination of both solid and liquid matter, but at relatively high expense. In order to provide adequate sealing of each individual box of the way cover, the components are normally welded together, and an epoxy resin or silicone is then sprayed or coated thereon. It is therefore to the design of the individual boxes 34 of way cover 20 that the present invention is directed.

Figure 2:
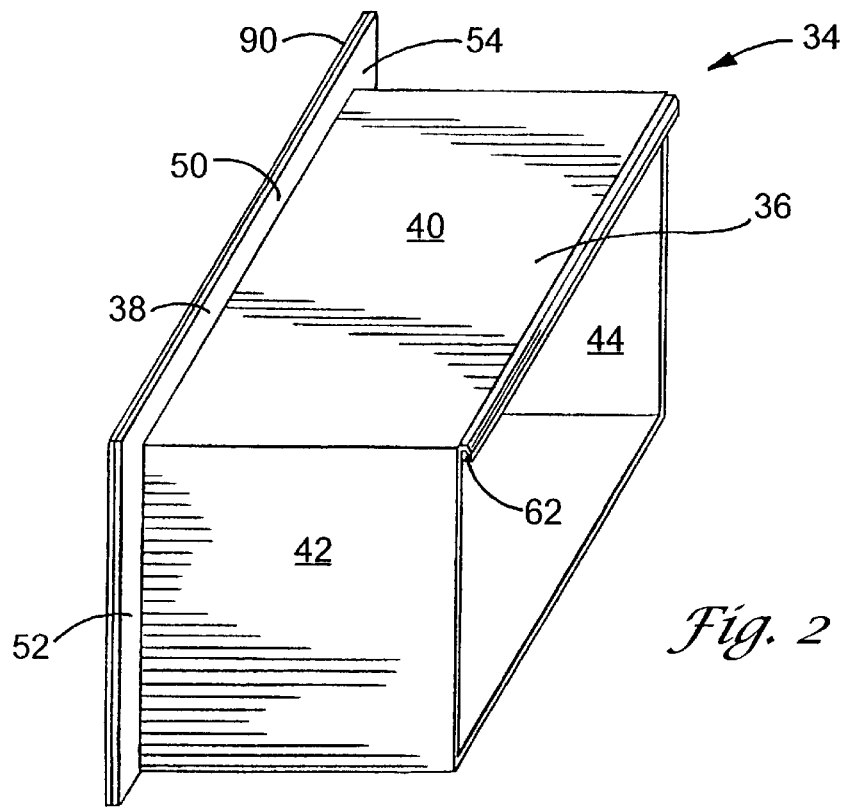
FIG. 2 is a perspective view of one individual box of the machine tool way cover shown in FIG. 1.
Figure 5:
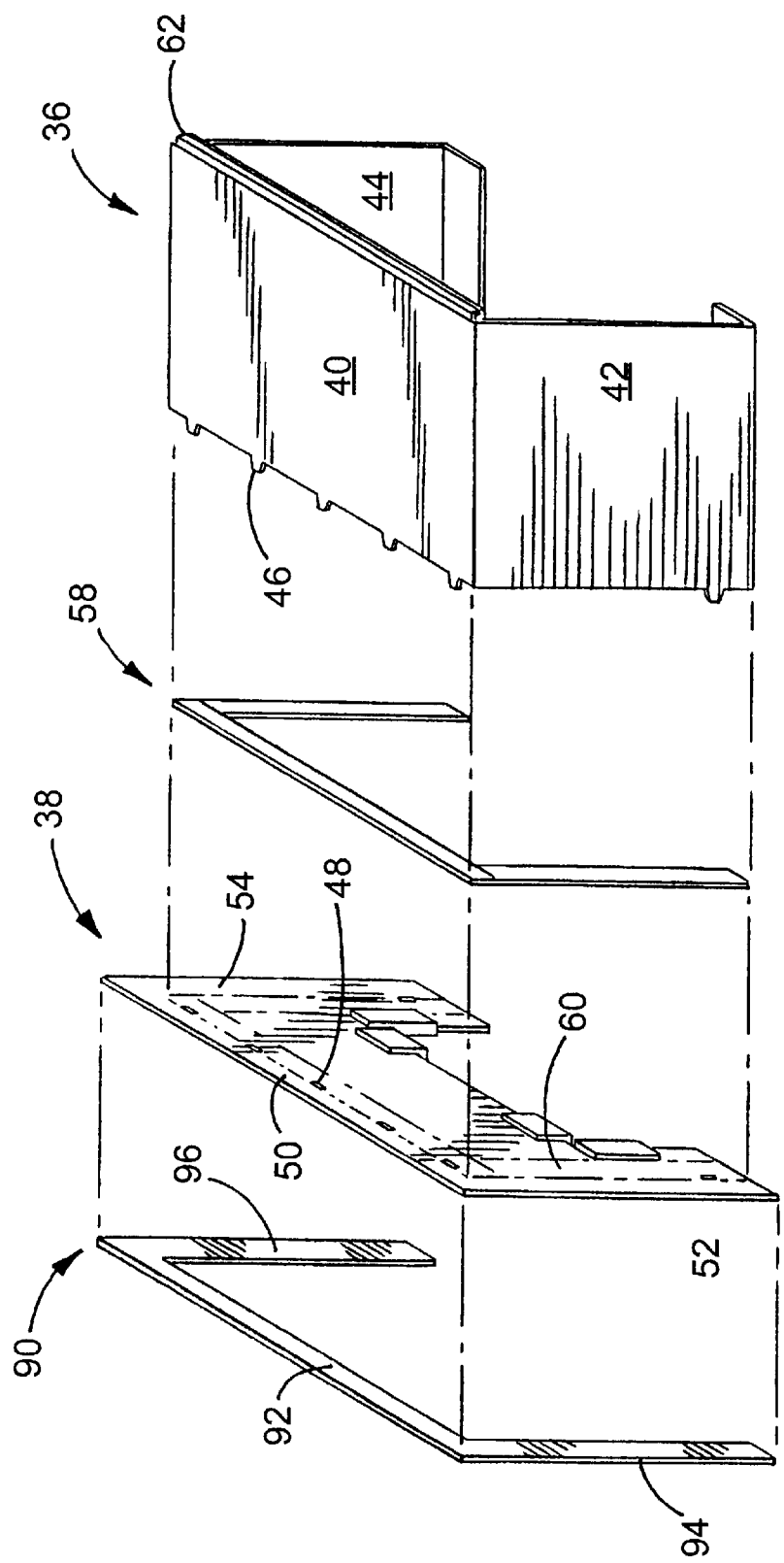
FIG. 5 is an exploded view of the embodiment shown in FIG. 1.

Turning now to FIG. 2, an individual box 34 is shown in perspective being comprised of an enclosure 36 and back panel 38. Enclosure 36 includes top 40 and integral sides 42 and 44. As will be described with further detail herein, tabs 46 (see FIG. 5) are provided integral with top 40 and sides 42 and 44 and extend parallel to the planes thereof. To accommodate tabs 46, back panel 38 includes a plurality of rectangular apertures 48 in top 50, side 52 and side 54. As best shown in FIG. 5, apertures 48 allow tabs 46 to penetrate therethrough and be bent over into engagement with back surface 56 of back panel 38 (see FIG. 3).

Figure 3:
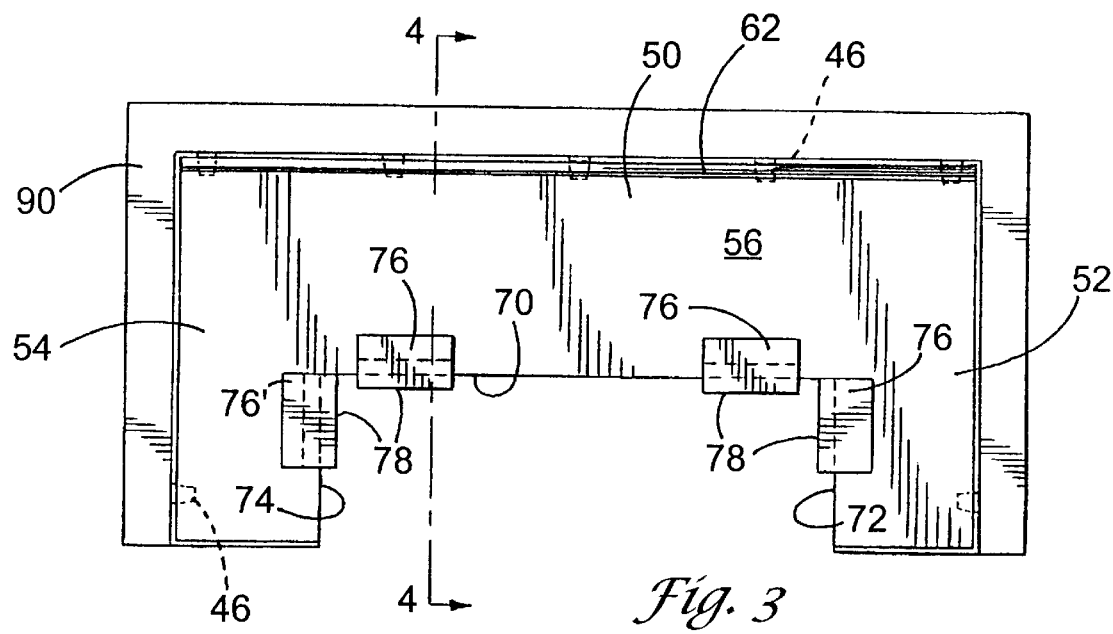
FIG. 3 is a back view of the box shown in FIG. 2.

After tabs 46 have been matingly received through apertures 48 of back panel 38, and bent into locking engagement therewith as shown in FIG. 3, back panel 38 is securely fastened to enclosure 36 and is thereby able to prevent solid matter from passing therebetween. In order to prevent liquid matter such as the aforementioned coolant from passing therethrough additional means need to be provided between the back panel and enclosure. In the present invention, this sealing means is provided in the form of strip 58 which, in the preferred embodiment, is in the form of an adhesive polyurethane tape which is first adhered to front surface 60 of back panel 38. Strip 58 is positioned so as to cover apertures 48 so that when tabs 46 penetrate through apertures 48, strip 58 is able to provide an adequate seal not only between the edges of back panel 38 and enclosure 36, but around tabs 46 as well.

It can therefore be seen that by assembling box 34 in accordance with the aforementioned procedure, both solid and liquid matter will be prevented from passing between back panel 38 and enclosure 36. As best shown in FIG. 1, this will thereby prevent debris 32 from passing therethrough and interfering with proper operation of transmission platform 22.

Again as best shown in FIG. 1, boxes 34 are manufactured in progressively smaller or larger dimensions so as to allow for the telescoping connection shown. In the extended position, debris 32 may fall onto tops 40 of boxes 34 and when way cover 20 is retracted as shown in phantom lines, the debris 32 is brought into engagement with wiper 62. If not for wiper 62, debris 32 would be allowed to engage the joint between enclosure 36 and back panel 38 and possibly detrimentally affect the seal therebetween. However by providing wiper 62, the top 40 of each box 34 is wiped clean with each retraction of way cover 20.

One of the inventive features of the present invention is directed to a manner in which wiper 62 is connected to inner surface 64 of each top 40. As shown in FIG. 2, grooved body 66 is attached to inner surface 64, and wiper 62 is provided with ridge 68 which is adapted to be slideably connected to grooved body 66. In the preferred embodiment, wiper 62 is manufactured from a suitable elastomeric material, while grooved body 66 is metallic and welded to inner surface 64. By providing wiper 62 in such a "tongue and groove" embodiment, wiper 62 is easily removed and replaced in the event the elastomeric material wiper 62 deteriorates.

Figure 4:
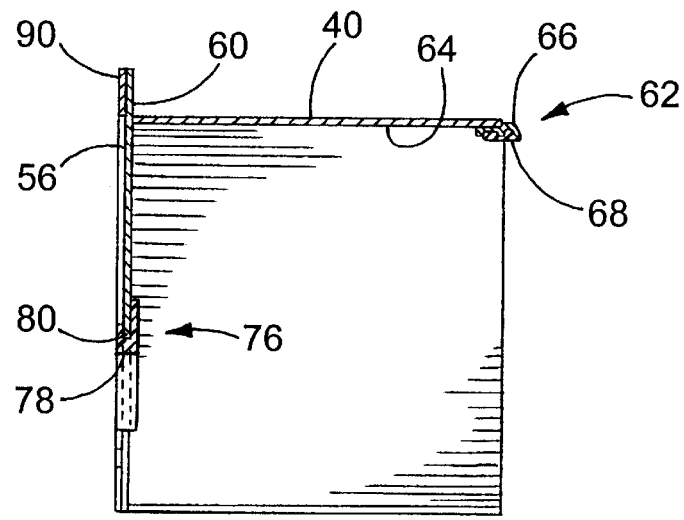
FIG. 4 is a sectional view of FIG. 2 taken along line 4—4.

As way cover 20 expands and retracts over transmission platform 22, inner edge 70 of top 50 and side edges 72 and 74 of back panel sides 52 and 54, respectively, ride on top of transmission platform 22. It is therefore desirable to provide some sort of lubrication or material having a low coefficient of friction therebetween so as not to detrimentally interfere with the expansion and retraction of way cover 20. In the preferred embodiment, this function is accomplished by guide members 76 and 76', which as best shown in FIG. 4, clip onto back panel 38 and are provided with smooth surface 78 for reduced frictional engagement with transmission platform 22. As shown best in FIG. 4, each guide member 76 is provided in the form of an L-shaped bracket with a groove 80 which accommodates back panel 38. It is to be understood that, in the preferred embodiment, guide members 76 and 76' are identical and interchangeable to thereby allow a single mold to form both, and thereby further reduce the manufacturing cost of way cover 20.

In order to provide proper spacing between each box 34, one embodiment of the present invention further includes spacer plate 90 which is spot welded to back panel 34. As shown in FIG. 5, spacer plate 90 includes top 92, and integral sides 94 and 96.

As described herein, the present invention provides an inexpensive machine tool way cover 20 and method for manufacture thereof. As opposed to prior art devices which require spot welding between the back panel and the enclosure, and then application of an epoxy resin or silicone to the joint therebetween, the present invention allows for a relatively inexpensive mechanical means of connection between the back panel and the enclosure as well as an inexpensive application of polyurethane tape therebetween to provide sealant against liquid matter. Therefore, not only does the present invention provide a less expensive way cover and manufacturing process based on the materials involved, but also allows for a quicker method of assembly than has heretofore been possible with prior art devices. Not only is manufacturing cost reduced, but the more importantly, the manufacturing cost is reduced without sacrificing the structural integrity and operational productivity required of machine tool way covers.

What is claimed is:

1. A machine tool way cover having a plurality of telescopingly connected enclosures, each enclosure comprising:

a first member having an integral top, first side, and second side, the first side, and second side having tabs extending therefrom;

a back panel having a top, first side and second side, the back panel perpendicularly connected to the first member, the back panel having a plurality of apertures adapted to matingly receive the first member tabs; and a sealing strip disposed between the first member and the back panel.

2. The machine tool way cover of claim 1 wherein the sealing strip is adhesive polyurethane tape.

3. The machine tool way cover of claim 1 further including guide members having low coefficients of friction attached to the top, first side, and second sides and adapted to ride on a surface of a machine tool as the machine tool way cover expands and contracts.

4. The machine tool way cover of claim 1 wherein the guide members are plastic.

5. The machine tool way cover of claim 1 wherein the first member top includes a front edge and a replaceable wiper, the replaceable wiper being attached to the front edge and being adapted to ride against the top of an adjoining first member top.

6. The machine tool way cover of claim 5 wherein the replaceable wiper is attached to the first member top by a grooved body fixedly attached to the first member top, the wiper having a ridge adapted to be slidably received within the grooved body to allow removal and attachment of the wiper.

* * * * *